W. ROSEN.
AUTOMOBILE TRAFFIC SIGNAL.
APPLICATION FILED DEC. 22, 1917.
1,283,314.
Patented Oct. 29, 1918.
2 SHEETS—SHEET 2.
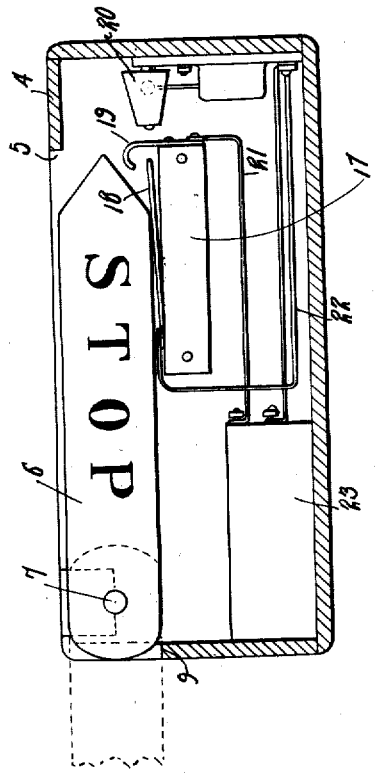
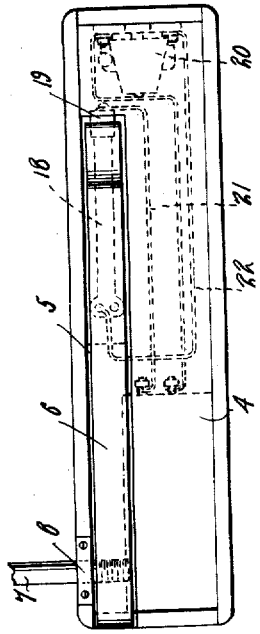
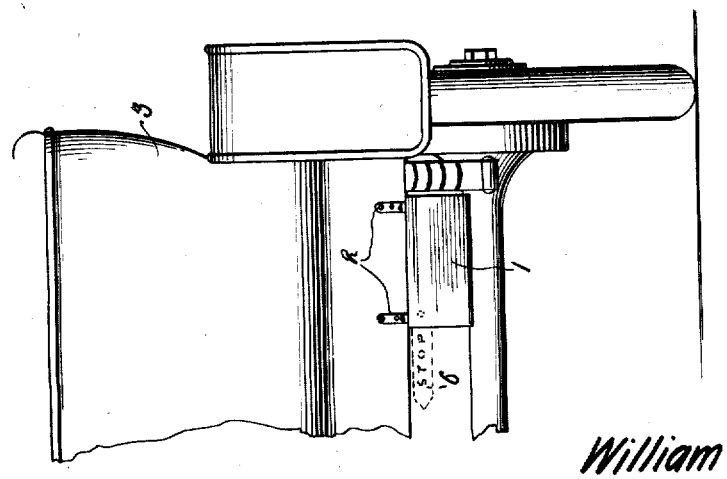
INVENTOR
William Rosen
WITNESSES
W. C. Fielding.
Lloyd W. Patch
BY
Richard Owen.
ATTORNEY

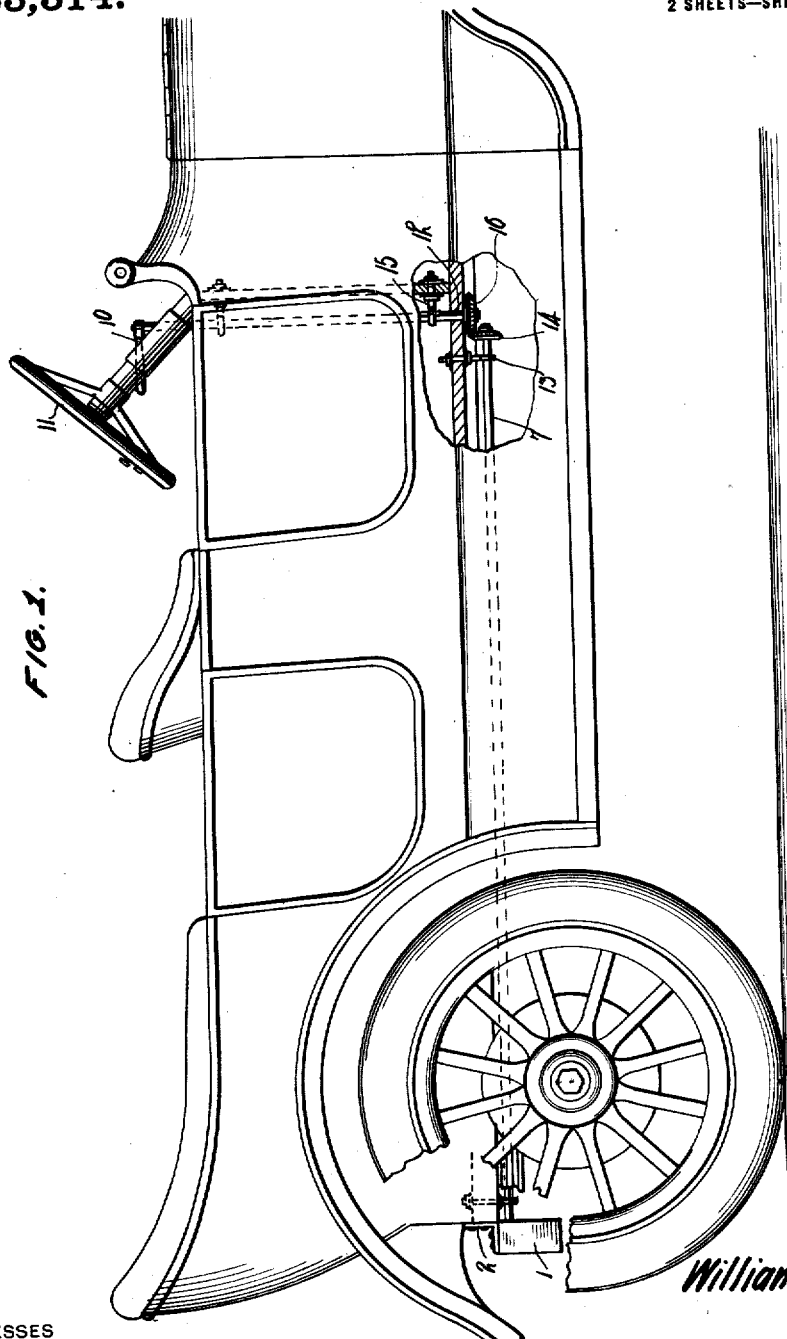

UNITED STATES PATENT OFFICE.

WILLIAM ROSEN, OF MIDDLETOWN, CONNECTICUT.

AUTOMOBILE TRAFFIC-SIGNAL.

1,283,314.  Specification of Letters Patent.  Patented Oct. 29, 1918.

Application filed December 22, 1917. Serial No. 208,464.

*To all whom it may concern:*

Be it known that I, WILLIAM ROSEN, a citizen of the United States, residing at Middletown, in the county of Middlesex and State of Connecticut, have invented certain new and useful Improvements in Automobile Traffic-Signals, of which the following is a specification.

This invention relates to an automobile traffic signal, and it is a purpose of the invention to provide a signal which can be invention upon an automobile or the vehicle stalled and which can be conveniently actuated by the operator to indicate to other parties approaching from the rear that the vehicle is about to be turned, stopped or otherwise maneuvered.

A further object lies in providing audible signal means by which the attention of parties outside of the vehicle will be drawn to the signal when the same is displayed and which parts are so arranged in conjunction with the signal that when the signal is in the covered or inoperative position the audible alarm or signal means is automatically rendered inoperative.

A still further object is to so construct the parts that the device may be manufactured as an attachment to be sold separately from automobiles and to be applied by the individual purchaser, the structure being such that the automobile need not be materially defaced or mutilated in the application of the parts.

With the above and other objects in view which will be in part described and in part understood from the specification, drawings and claims, my invention consists in certain novel features of construction and combination of parts to be hereinafter more fully set forth.

In the drawings:—

Figure 1 is a view in elevation of the body portion of an automobile with the structure of my invention applied thereto and with parts of the body structure broken away to clearly disclose the manner of mounting the signal device;

Fig. 2 is a fragmentary rear elevational view of the automobile;

Fig. 3 is a sectional view taken through the main signal case; and,

Fig. 4 is a top plan view of the structure shown in Fig. 3.

As is here indicated, the device is shown fitted to an automobile of the touring car type, although of course it will be appreciated that the device may be fitted upon any other type of automobile and might even be used upon horse-drawn or other vehicles.

A case 1 is mounted by the brackets 2, or in any other suitable way, on the rear of the body 3 of the automobile, and is preferably disposed low down and on the right hand side at a point substantially opposite to the position of the license carriage although it will be evident that the position of mounting has very little to do with the successful operation of the signal. This case 1 comprises the sides, end, and bottom, and the top 4 thereof is provided with a slotted opening 5 which is formed adjacent one of the sides. The case 1 is intended as a housing for the visible and audible signal means, and an arm 6 is carried by a shaft 7 which shaft is revolubly mounted in a suitable bearing 8, so that the signal arm is carried to swing through the slot opening 5 of the top 4 of the case, the adjacent end of the case being cut away to permit the arm to be extended substantially at right angles to the position shown in the full lines of Fig. 3, in which relation the top edge 9 of the end forms a stop to limit downward swinging movement of the arm. This arm 6 can be painted to be a distinctive color and might have wording placed thereon, or the arm might be provided with a transparent front and be illuminated for night use of the signal device, but since semaphore arms of various types have now been used in a number of different connections, it is not here deemed necessary to show possible modification of the structure of the arms and to go into detail in the description of the same.

To accomplish operation of the signal arm 6 in swinging the same into the case 1 and from the case, the operating handle 10 is provided adjacent the steering wheel 11 of the automobile, this operating handle being carried on a shaft 12. The shaft 7 is extended forwardly beneath the floor of the automobile body and is journaled in suitable bearings 13, this shaft at its forward end having the beveled gear wheel 14 secured in place. The shaft 12 is mounted in suitable bearings 15 on the dash of the automobile body, or secured at other convenient points, and at its lower end has the miter gear 16 which meshes with the gear 14. By this arrangement of parts, as the operating handle 10 is swung, the shaft 7 will be turned and in consequence the arm 6 will be swung to each of its extreme positions.

As has been stated above, it is a purpose of my invention to arrange in conjunction with the visible signal arm, an audible alarm or signal means, and with this purpose in view I mount a block 17 within the casing at such a point that it is pulled slightly below the position at which the arm is to be stopped when swung in the casing. This has a spring leaf 18 mounted at one end thereof in such a position that as the signal arm 6 is swung to rest within the casing it will bear upon this spring leaf and depress the same to a considerable degree. A substantially hooked shaped contact member 19 is mounted on that end of the block 17 adjacent to which the free end of the leaf spring 18 swings, and this contact member is of such shape that as the leaf is relieved of the pressure of the arm 6 through the swinging of the same to the extended or signaling position, the leaf spring will rise to contact with the overhanging portion of the contact member. A bell 20, or other suitable signal means, is mounted within the casing and circuit wires 21 and 22 which are connected with the contact member 19 and the leaf spring member 18 are extended to form a circuit connected with a battery 23, and which circuit includes the bell 22. It will of course be understood that the circuit wires 21 and 22 might be extended to connect with storage batteries or with any other suitable source of electrical energy and in fact the bell 20 or any other suitable signal means might be located at some other point than that shown.

From the foregoing, it will be seen that I have provided an automobile traffic signal which is made up of comparatively few parts and which can consequently be manufactured and sold at a minimum expense, but which at the same time, presents the parts in such a way that very efficient operation is accomplished and that the signal warning given is impressed both visibly and audibly upon a party following the machine upon which the signal mechanism in installed.

While in the foregoing I have shown and described the specific embodiment of the present invention, it is to be understood that in practice I do not limit myself to such specific details but may resort to any practical modifications falling within the scope of the invention as defined in the appended claims.

I claim:

1. An automobile traffic signal comprising a casing to be attached upon the rear of the vehicle structure and having an opening in the top thereof, a signal arm pivotally mounted within the casing to be swung to a position of extension therefrom and be swung through the opening in the top of the casing to a position at rest within said casing, an electrically actuated signal means within the casing, a block mounted in the casing adjacent the point occupied by the signal arm when in a position of rest, a spring contact member mounted on said block in a position to be engaged by the signal arm when the same is swung within the casing, an overhanging contact member carried by the block in a position to be engaged by the spring contact member when the same is released through swinging of the signal to the extended and indicating position, and a circuit connection from the spring member and the contact member to the electrically actuated signal to cause the same to be actuated when the circuit is closed through the engagement of the spring member with the contact member.

2. An automobile traffic signal comprising a casing to be attached upon the rear of the vehicle structure and having an opening in the top thereof, a signal arm pivotally mounted within the casing to be swung to a position of extension therefrom and be swung through the opening in the top of the casing to a position at rest within said casing, an electrically actuated signal means within the casing, a block mounted in the casing adjacent the point occupied by the signal arm when in a position of rest, a spring contact member mounted on said block in a position to be engaged by the signal arm when the same is swung within the casing, an overhanging contact member carried by the block in a position to be engaged by the spring contact member when the same is released through swinging of the signal to the extended and indicating position, a circuit connection from the spring member and the contact member to the electrically actuated signal to cause the same to be actuated when the circuit is closed through the engagement of the spring member with the contact member, and manually actuatable means by which the signal arm is swung to each of its extreme positions.

3. An automobile traffic signal comprising a casing to be attached upon the rear of the vehicle structure and having an opening in the top thereof, a signal arm pivotally mounted within the casing to be swung to a position of extension therefrom and be swung through the opening in the top of the casing to a position at rest within said casing, an electrically actuated signal means within the casing, a block mounted in the casing adjacent the point occupied by the signal arm when in a position of rest, a spring contact member mounted on said block in a position to be engaged by the signal arm when the same is swung within the casing, an overhanging contact member carried by the block in a position to be engaged by the spring contact member when the same is released through swinging of the signal to the extended and indicating position, a circuit connection from the spring member and the contact member to the electrically actuated signal to cause the same to be actuated when the circuit is closed through the engagement of the spring member with the contact member, a shaft extending from the signal arm and having a gear on the end thereof, a shaft mounted in an upright relation on the forward part of the machine and having an operating handle carried thereby at a point to be accessible to the operator, and a gear wheel carried by the last mentioned shaft and meshing with the first mentioned gear wheel to establish an actuating connection from the operating arm to the signal arm.

In testimony whereof I affix my signature in presence of two witnesses.

WILLIAM ROSEN.

Witnesses:
JACOB KABATZNICK,
DANIEL H. DEASY.